US010241546B2

(12) United States Patent
Lu et al.

(10) Patent No.: US 10,241,546 B2
(45) Date of Patent: Mar. 26, 2019

(54) PORTABLE ELECTRONIC DEVICE AND TOUCH MODULE CONTROLLING METHOD THEREOF

(71) Applicants: Ming-Shun Lu, Taipei (TW);
Ming-Chung Liu, Taipei (TW);
Hsin-Chieh Fang, Taipei (TW);
Yu-Wen Cheng, Taipei (TW); Yu-Ning Chang, Taipei (TW)

(72) Inventors: Ming-Shun Lu, Taipei (TW);
Ming-Chung Liu, Taipei (TW);
Hsin-Chieh Fang, Taipei (TW);
Yu-Wen Cheng, Taipei (TW); Yu-Ning Chang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 66 days.

(21) Appl. No.: 15/169,748

(22) Filed: Jun. 1, 2016

(65) Prior Publication Data

US 2016/0349909 A1    Dec. 1, 2016

Related U.S. Application Data

(60) Provisional application No. 62/168,920, filed on Jun. 1, 2015.

(51) Int. Cl.
*G06F 1/16* (2006.01)
*G06F 3/02* (2006.01)

(52) U.S. Cl.
CPC ............ *G06F 1/1677* (2013.01); *G06F 1/169* (2013.01); *G06F 1/1624* (2013.01); *G06F 1/1662* (2013.01); *G06F 3/0227* (2013.01)

(58) Field of Classification Search
CPC ....... G06F 1/1677; G06F 1/169; G06F 1/1662
See application file for complete search history.

(56) References Cited

U.S. PATENT DOCUMENTS

| 5,198,991 A | * | 3/1993 | Pollitt | ....................... B41J 5/105 341/20 |
| 6,055,153 A | * | 4/2000 | Chiu | ....................... G06F 1/1616 361/679.09 |

(Continued)

FOREIGN PATENT DOCUMENTS

CN            202058072 U   *   11/2011

*Primary Examiner* — Nitin Patel
*Assistant Examiner* — Robert M Stone
(74) *Attorney, Agent, or Firm* — JCIPRNET (57) ABSTRACT

A portable electronic device includes a first body and a second body. The second body includes a processing unit, and a first touch panel, a second touch panel, a keyboard and at least one detecting module electrically connected to the processing unit, respectively. The keyboard is slidably disposed above the second touch panel, and the detecting module is adapted to detect a position of the keyboard. When the keyboard is located at a first position, the keyboard module covers the second touch panel, and the detecting module transmits a first signal to the processing unit so that the first touch panel is turned on. When the keyboard is located at a second position, the keyboard exposes the second touch panel, and the detecting module transmits a second signal to the processing unit so that the first touch panel is turned off. A touch panel controlling method of the portable electronic device is further provided.

14 Claims, 10 Drawing Sheets

(56) References Cited

U.S. PATENT DOCUMENTS

| | | | |
|---|---|---|---|
| 2002/0042853 A1* | 4/2002 | Santoh | G06F 1/1624 710/8 |
| 2002/0180704 A1* | 12/2002 | Rudd | G06F 3/0213 345/168 |
| 2003/0064688 A1* | 4/2003 | Mizuta | H04M 1/0237 455/90.2 |
| 2004/0108968 A1* | 6/2004 | Finke-Anlauff | G06F 1/1616 345/1.1 |
| 2010/0039768 A1* | 2/2010 | Wang | G06F 1/1616 361/679.58 |
| 2010/0120478 A1* | 5/2010 | Nomura | H04M 1/0241 455/575.4 |
| 2011/0009174 A1* | 1/2011 | Ladouceur | H04M 1/0216 455/575.3 |
| 2011/0047459 A1* | 2/2011 | Van Der Westhuizen | G06F 1/1692 715/702 |
| 2011/0187646 A1* | 8/2011 | Mahmoud | G06F 3/02 345/168 |
| 2012/0242581 A1* | 9/2012 | Laubach | G06F 3/04812 345/168 |
| 2013/0331041 A1* | 12/2013 | Teshima | H04B 1/40 455/73 |
| 2016/0091929 A1* | 3/2016 | Kwong | G06F 1/1639 345/173 |
| 2016/0202778 A1* | 7/2016 | Su | G06F 1/16 345/168 |

\* cited by examiner

PORTABLE ELECTRONIC DEVICE AND TOUCH MODULE CONTROLLING METHOD THEREOF

CROSS-REFERENCE TO RELATED APPLICATION

This application claims the priority benefits of U.S. provisional application Ser. No. 62/168,920, filed on Jun. 1, 2015. The entirety of the above-mentioned patent application is hereby incorporated by reference herein and made a part of this specification.

BACKGROUND OF THE INVENTION

1. Field of the Invention

The invention generally relates to an electronic device and a controlling method thereof, and more particularly, to a portable electronic device and a touch panel controlling method thereof.

2. Description of Related Art

In a typical notebook computer, data and command are mainly inputted through a keyboard module and a single touch panel. In tennis of the touch panel, a user can use a finger to move on the touch panel to control a movement of a cursor and control a virtual button on the screen to execute a function command with the cursor. As technology advances, performance of the notebook computer becomes better and better so as to bear operations requiring a high-performance, such as gaming or drawing.

However, when the notebook computer executes the operations requiring a high-performance, current input module (the keyboard module and the single touch panel) is unable to provide the user with sufficient convenience and fast operation experience, and thus is inadequate for use. In addition, if the notebook computer is to be added with additional input modules thereon, then problems such as space configuration and operational convenience of the user are further required to be taken into consideration.

SUMMARY OF THE INVENTION

The invention provides a portable electronic device, having a plurality of touch panels for providing diversified input methods, and capable of using a keyboard module to control a specific touch panel to be turned on or off, so as to avoid an inadvertent touch of user.

The invention provides a touch panel controlling method of portable electronic device, which is directed to a portable electronic device having a plurality of touch panels, through moving a keyboard module to control a specific touch panel to be turned on or off.

A portable electronic device of the invention includes a first body and a second body. The first body includes a display screen. The second body is pivoted and electrically connected to the first body and includes a processing unit, a first touch panel, a second touch panel, a keyboard module and at least one detecting module. The first touch panel, the second touch panel, the keyboard module and the at least one detecting module are electrically connected to the processing unit, respectively. The keyboard module is slidably disposed above the second touch panel, and the at least one detecting module is adapted to detect a position of the keyboard module. When the keyboard module is located at a first position, the keyboard module covers the second touch panel, and the detecting module transmits a first signal to the processing unit to turn on the first touch panel. When the keyboard module is located at a second position, the keyboard module exposes the second touch panel, and the detecting module transmits a second signal to the processing unit to turn off the first touch panel.

In one embodiment of the invention, the second body further includes a third touch panel electrically connected to the processing unit. The keyboard module is slidably disposed above the third touch panel. When the keyboard module is located at the first position, the keyboard module exposes the third touch panel. When the keyboard module is located at the second position, the keyboard module covers the third touch panel.

In one embodiment of the invention, when the keyboard module is located at the first position or the second position, the second touch panel and the third touch panel are both in a turned-on state.

In one embodiment of the invention, when the keyboard module is located at the first position, the second touch panel is turned off and the third touch panel is turned on. When the keyboard module is located at the second position, the second touch panel is turned on and the third touch panel is turned off.

In one embodiment of the invention, the second body includes a casing. The first touch panel, the second touch panel and the third touch panel are exposed from the casing. The keyboard module includes a first sliding structure, and the casing includes a second sliding structure corresponded to the first sliding structure so as to enable the keyboard module to be slidingly disposed on the casing. The second sliding structure is disposed between the second touch panel and the third touch panel.

In one embodiment of the invention, the at least one detecting module includes a magnetic sensing module. The magnetic sensing module includes at least one magnetic member and a magnetic sensor. One of the at least one magnetic member and the magnetic sensor is disposed at a lower surface of the keyboard module, and the other one is disposed on the casing at a portion covered by the keyboard module.

In one embodiment of the invention, the at least one detecting module includes an optical sensing module. The optical sensing module includes at least one reflector and an optical sensor. One of the at least one reflector and the optical sensor is disposed at a lower surface of the keyboard module, and the other one is disposed on the casing at a portion covered by the keyboard module.

In one embodiment of the invention, the at least one detecting module includes a sensing switch. The sensing switch is disposed on the casing at a portion covered by the keyboard module and a lower surface of the keyboard module includes at least one recessed hole, or the sensing switch is disposed at the lower surface of the keyboard module and the casing includes at least one recessed hole at a portion covered by the keyboard module.

In one embodiment of the invention, the second touch panel and the third touch panel are respectively a gaming touch panel, a handwriting touch panel, a digital key touch panel, a music touch panel or a touch panel with arrow keys.

In one embodiment of the invention, the processing unit comprises a controller, an embedded controller (EC), a central processing unit (CPU) or a micro controller unit (MCU).

A touch panel controlling method of a portable electronic device of the invention includes: providing a portable electronic device, wherein the portable electronic device includes a first body and a second body pivoted and electrically connected to the first body, the second body includes a processing unit, a first touch panel, a second touch panel, a keyboard module and at least one detecting module, wherein the first touch panel, the second touch panel, the keyboard module and the at least one detecting module are electrically connected to the processing unit, respectively, and the keyboard module is slidably disposed above the second touch panel to cover or expose the second touch panel; the at least one detecting module detecting whether the keyboard module is located at a first position or a second position, wherein when the keyboard module is located at the first position, the keyboard module covers the second touch panel, and when the keyboard module is located at the second position, the keyboard module exposes the second touch panel; if the keyboard module is located at the first position, then the at least one detecting module transmits a first signal to the processing unit to turn on the first touch panel; and if the keyboard module is located at the second position, then the at least one detecting module transmits a second signal to the processing unit to turn off the first touch panel.

In one embodiment of the invention, the second body further includes a third touch panel electrically connected to the processing unit. The keyboard module is slidably disposed above the third touch panel. In the step of the at least one detecting module transmitting the first signal to the processing unit and the step of the at least one detecting module transmitting the second signal to the processing unit, the second touch panel and the third touch panel are both in a turned-on state.

In one embodiment of the invention, the second body further includes a third touch panel electrically connected to the processing unit, the keyboard module is slidably disposed above the third touch panel. In the step of the at least one detecting module transmitting the first signal to the processing unit, the second touch panel is turned off and the third touch panel is turned on. In the step of the at least one detecting module transmitting the second signal to the processing unit, the second touch panel is turned on and the third touch panel is turned off.

In one embodiment of the invention, the at least one detecting module detects whether the keyboard module is located at the first position or the second position through using magnetic sensing, optical sensing or a sensing switch.

In one embodiment of the invention, the second body further includes a third touch panel electrically connected to the processing unit. The keyboard module is slidably disposed above the third touch panel. The second touch panel and the third touch panel are respectively a gaming touch panel, a handwriting touch panel, a digital key touch panel, a music touch panel or a touch panel with arrow keys.

In one embodiment of the invention, the processing unit comprises a controller, an embedded controller (EC), a central processing unit (CPU) or a micro controller unit (MCU).

In view of the above, the portable electronic device of the invention has the plurality of touch panels, that is, in addition to a touch panel generally being used to operate a cursor, the portable electronic device can further be configured with at least one touch panel with other functions, such as a gaming touch panel, a handwriting touch panel, a digital key touch panel, a music touch panel or a touch panel with arrow keys, thereby providing the user with faster and more diversified input methods. The invention further provides the touch panel controlling method of the portable electronic device, and in the portable electronic device of the invention, the keyboard module is slidably disposed above at least one touch panel to cover or expose the touch panel, and the processing unit turns on or off the touch panel which is not being covered during the movement of the keyboard module according to the position of the keyboard module detected by the detecting module. With the aforementioned touch panel controlling method, the portable electronic device, in addition to becoming more power saving, can further be avoided from inadvertent touch event, and thus enhances the operational convenience of the user.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
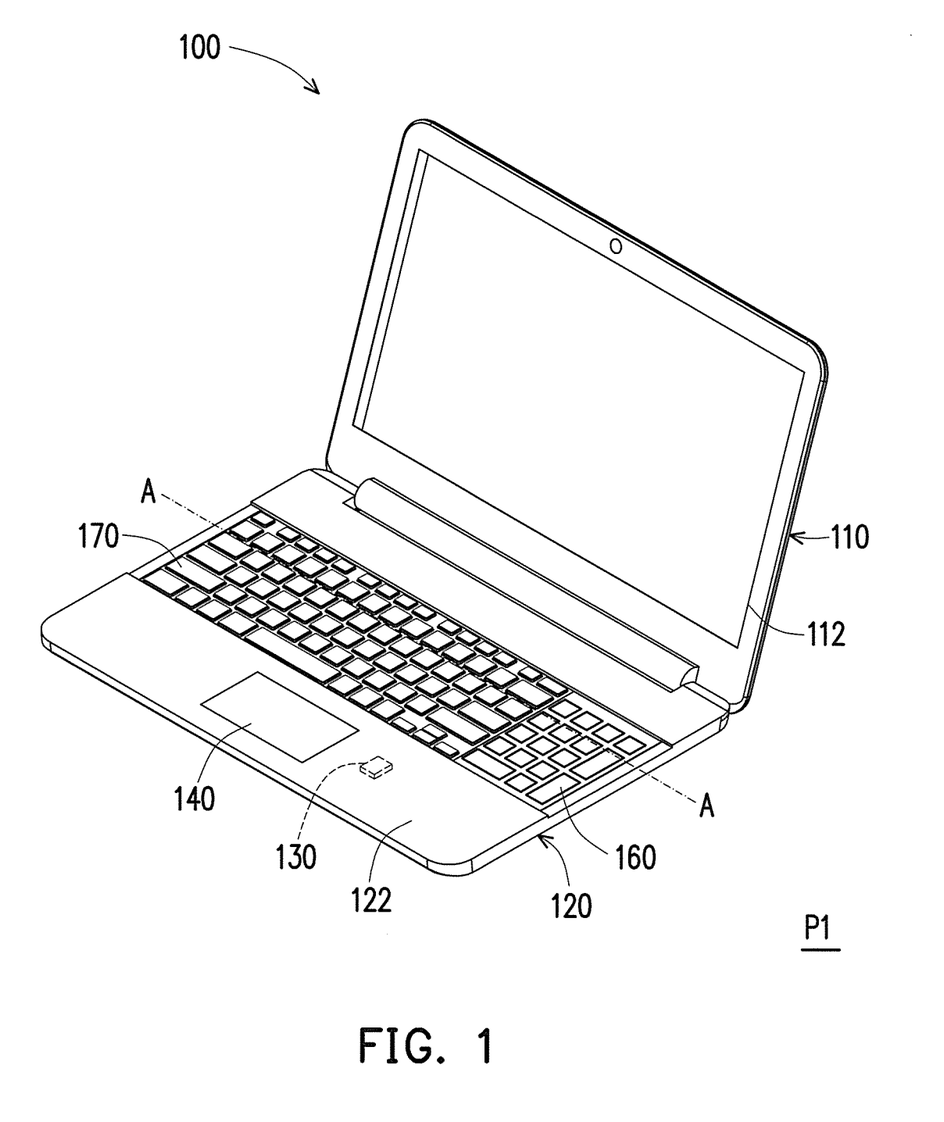
FIG. 1 is a schematic diagram illustrating a keyboard module of a portable electronic device being located at a first position according an embodiment of the invention.
Figure 2:
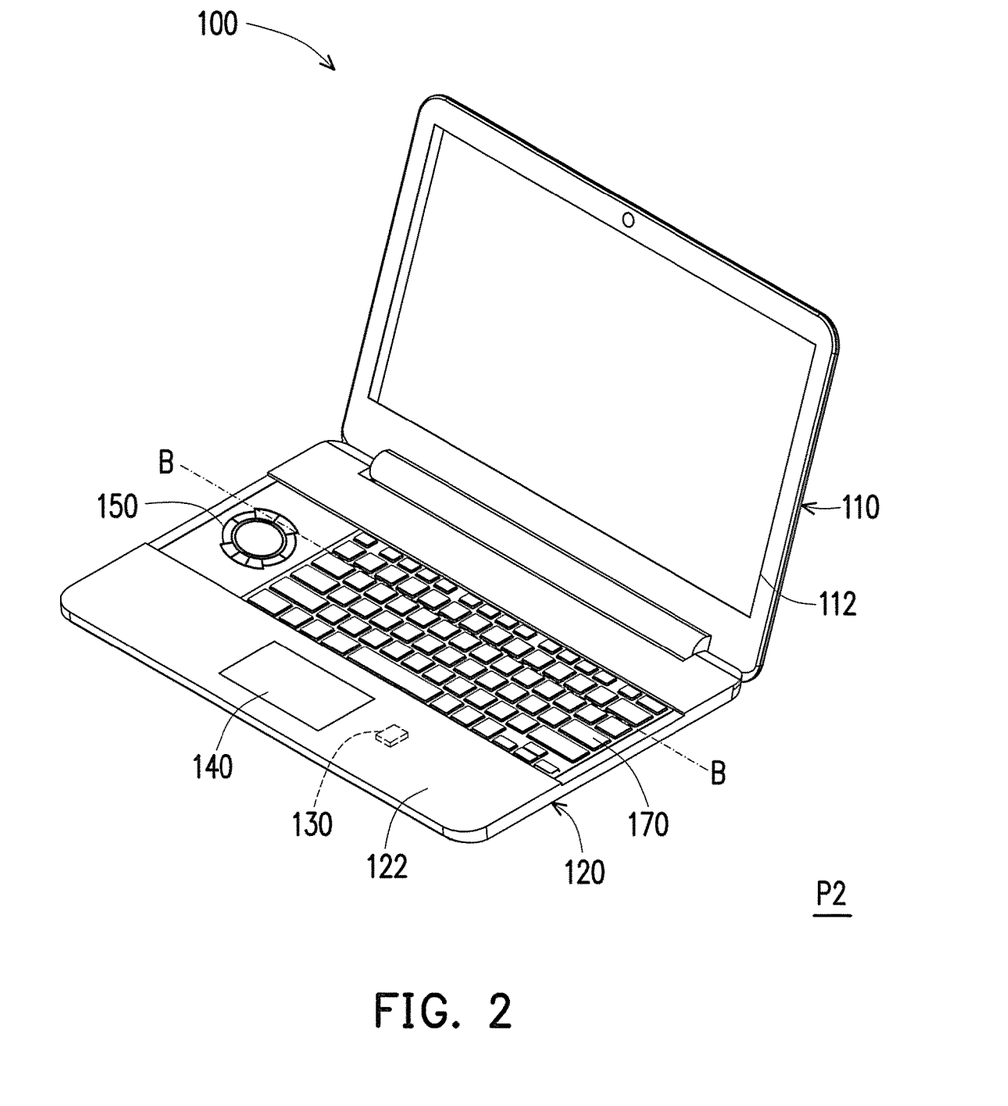
FIG. 2 is a schematic diagram illustrating the keyboard module of the portable electronic device of FIG. 1 being located at a second position.
Figure 3:
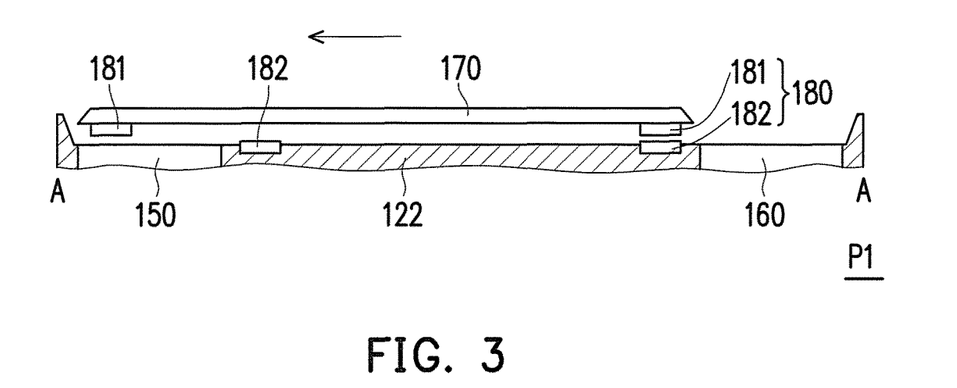
FIG. 3 is a partial schematic cross-sectional diagram of FIG. 1 along a line segment A-A.
Figure 4:
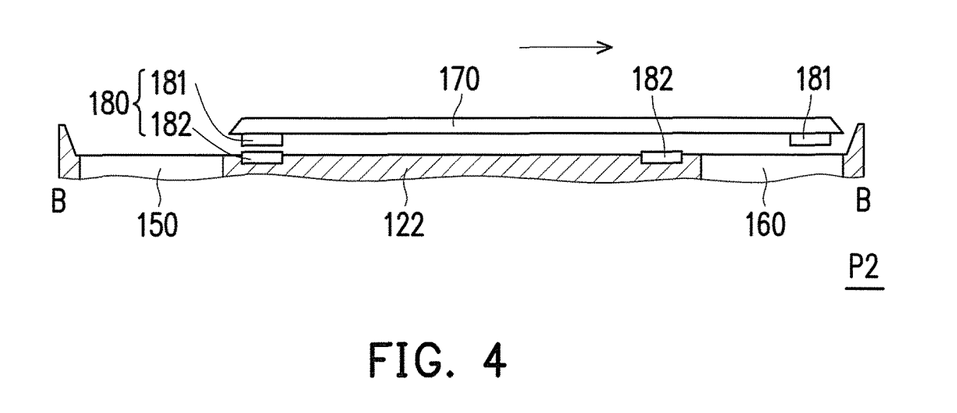
FIG. 4 is a partial schematic cross-sectional diagram of FIG. 2 along a line segment B-B.

FIG. 1 is a schematic diagram illustrating a keyboard module of a portable electronic device being located at a first position according to an embodiment of the invention. FIG. 2 is a schematic diagram illustrating the keyboard module of the portable electronic device of FIG. 1 being located at a second position. FIG. 3 is a partial schematic cross-sectional diagram of FIG. 1 along a line segment A-A. FIG. 4 is a partial schematic cross-sectional diagram of FIG. 2 along a line segment B-B.

Referring to FIG. 1 through FIG. 4, a portable electronic device 100 of the present embodiment includes a first body 110 and a second body 120. The portable electronic device 100 of the present embodiment is, for example, a notebook computer, but the type of the portable electronic device 100 is not limited thereto. The first body 110 includes a display screen 112, and the second body 120 is pivoted and electrically connected to the first body 110.

The second body 120 includes a casing 122, a processing unit 130, a first touch panel 140, a second touch panel 150, a third touch panel 160, a keyboard module 170 and at least one detecting module 180 (as indicated in FIG. 3 and FIG. 4). The processing unit 130 is located within the casing 122. The first touch panel 140, the second touch panel 150, the third touch panel 160, the keyboard module 170 and the detecting module 180 are exposed from the casing 122. In the present embodiment, the first touch panel 140, the second touch panel 150, the third touch panel 160, the keyboard module 170 and the detecting module 180 are electrically connected to the processing unit 130, respectively. In the embodiment of the invention, the processing unit 130 is a central processing unit (CPU), but in other embodiments, the processing unit 130 may be a controller, an embedded controller (EC) or a micro controller unit (MCU), the type of the processing unit 130 is not limited thereto.

In the present embodiment, the keyboard module 170 is slidably disposed above the second touch panel 150 and the third touch panel 160. Specifically, the keyboard module 170 can slide between a first position P1 (as shown in FIG. 1 and FIG. 3) and a second position P2 (as shown in FIG. 2 and FIG. 4) in relation to the casing 122. When the keyboard module 170 is located at the first position P1, the keyboard module 170 covers the second touch panel 150 and exposes the third touch panel 160. When the keyboard module 170 is located at the second position P2, the keyboard module 170 exposes the second touch panel 150 and covers the third touch panel 160. That is to say, a user can self-select to use the second touch panel 150 or the third touch panel 160 by moving the position of the keyboard module 170.

In the present embodiment, the first touch panel 140 is a conventional touch panel for operating a cursor in a typical notebook computer, while the second touch panel 150 and the third touch panel 160 are respectively a gaming touch panel, a handwriting touch panel, a digital key touch panel, a music touch panel or a touch panel with arrow keys. Specifically, in the present embodiment, the second touch panel 150 is a gaming touch panel and the third touch panel 160 is a digital key touch panel, but the types of the second touch panel 150 and the third touch panel 160 are not limited thereto.

For instance, in the practical use by the user, if the portable electronic device 100 is in a general operating mode, then the keyboard module 170 can be move to the first position P1 to expose the third touch panel 160, and the third touch panel 160 can provide a digital key function so that the user can input digits without switching the use mode of the keyboard, thereby enhancing an input efficiency of the user. If the portable electronic device 100 is in a gaming mode, then the keyboard module 170 can be moved to the second position P2 to expose the second touch panel 150, and the user can use right hand to operate a mouse (not shown) and left hand to operate gaming shortcut keys of the second touch panel 150, such that the user can input gaming operation commands more quickly through the gaming shortcut keys of the gaming touch panel. As such, the user is provided with a more favorable gaming operation interface.

It is to be noted that, when the user is operating the third touch panel 160, the first touch panel 140 is generally not being used. However, since the position of the first touch panel 140 is slightly towards the left side of the casing 122, the left wrist of the user may inadvertently touch the first touch panel 140 when the user operates the second touch panel 150, and thereby input erroneous information. In order to avoid such problem, in the present embodiment, the detecting module 180 can be used to detect the position of the keyboard module 170, so that the processing unit 130 can control the first touch panel 140 to be turned on or turned off according to a detection result of the detecting module 180 so as to prevent the aforementioned inadvertent touch problem while simultaneously provide a power saving effect.

In the present embodiment, the detecting module 180 detects the position of the keyboard module 170 with magnetic force. As shown in FIG. 3 and FIG. 4, the second body 120 includes two sets of detecting modules 180. Each set of the detecting modules 180 is a magnetic sensing module and includes a magnetic member 181 (such as a magnet) and a magnetic sensor 182. One of the magnetic member 181 and the magnetic sensor 182 is disposed at a lower surface of the keyboard module 170 while the other one is disposed on the casing 122 at a portion covered by the keyboard module 170.

Specifically, as shown in FIG. 3 and FIG. 4, the two magnetic members 181 are disposed at the lower surface of the keyboard module 170 and are close to the two sides. The two magnetic sensors 182 are disposed on the casing 122 at portions covered by the keyboard module 170. One of the magnetic sensors 182 is disposed close to the second touch panel 150 and the other one is disposed close to the third touch panel 160. Since the first touch panel 140 is needed under the general operating mode, as shown in FIG. 3, when the keyboard module 170 is located at the first position P1 (namely, when the keyboard module 170 covers the second touch panel 150 and exposes the third touch panel 160), the magnetic member 181 and the magnetic sensor 182 located at the right side are aligned. The magnetic sensor 182 located at the right side senses a magnetic force of the magnetic member 181 located above and transmits a sensing result to the processing unit 130 with a first signal, so as to turn on the first touch panel 140.

Similarly, as shown in FIG. 4, when the keyboard module 170 is located at the second position P2 (namely, when the keyboard module 170 covers the third touch panel 160 and exposes the second touch panel 150), the magnetic member 181 and the magnetic sensor 182 located at the left side are aligned. The magnetic sensor 182 located at the left side senses a magnetic force of the magnetic member 181 located above and transmits a sensing result to the processing unit 130 with a second signal, so as to turn off the first touch panel 140 to prevent an inadvertent touch of the user.

It is to be explained that, in the present embodiment, whether the keyboard module 170 is located at the first position P1 or the second position P2, the second touch panel 150 and the third touch panel 160 are both in a turned-on state. Since the keyboard module 170 covers one of the second touch panel 150 and the third touch panel 160 at different positions, the user is prevented from inadvertently touch the second touch panel 150 or the third touch panel 160.

If desired to make the portable electronic device 100 more power saving, in other embodiments, when the keyboard module 170 is located at the first position P1, the processing unit 130, in addition to controlling the first touch panel 140 and the third touch panel 160 to be turned on, may further turn off the second touch panel 150 covered by the keyboard module 170. Similarly, when the keyboard module 170 is located at the second position P2, the processing unit 130, in addition to controlling the first touch panel 140 to be turned off and the second touch panel 150 to be turned on, may further turn off the third touch panel 160.

Moreover, it is to be noted that, in the present embodiment, the first touch panel 140 is located on a plane which is slightly lower than other planes of the surrounding casing 122, and the first touch panel 140 and the surrounding casing 122 are not integrally formed so that the user can easily see or touch the actual position of the first touch panel 140. However, in other embodiments, the plane on which the first touch panel 140 is located may also be the same height as the plane on which the surrounding casing 122 is located, and the first touch panel 140 and the surrounding casing 122 may also be integrally formed. In other words, the user is unable to see or touch the edge of the first touch panel 140.

In addition, in the present embodiment, the first touch panel 140 only occupies a small block, that is, the casing 122 is only required to be dug with a small opening thereon to dispose the first touch panel 140. However, in another embodiment, the first touch panel 140 may also extend to a border line of the casing 122 towards the left and right sides and a direction close to the user. In other words, the first touch panel 140 may also be expanded to be presented on a surface of the casing at a portion between the keyboard module 170 and the user. Certainly, only a few possible forms of the first touch panel 140 is provided on the above, the position, the area, a height relationship with the casing 122, a size ratio and a manufacturing method of the first touch panel 140 are not limited to the above descriptions.

Moreover, it is to be explained that, although in the present embodiment that the second body 120 includes three touch panels, in other embodiments, the second body 120 may also do not have the third touch panel 160. In the present embodiment, when the keyboard module 170 is located at the first position P1 or the second position P2, the keyboard module 170 covers or exposes the second touch panel 150, and the processing unit 130 correspondingly turn on or turn off the first touch panel 140. Furthermore, in order to save power, in other embodiments, when the keyboard module 170 is located at the first position P1, the processing unit 130, in addition to controlling the first touch panel 14 to be turned on, may further turn off the second touch panel 150 covered by the keyboard module 170. Similarly, when the keyboard module 170 is located at the second position P2, the processing unit 130, in addition to controlling the first touch panel 140 to be turned off, may further turn on the second touch panel 150.

Moreover, it is to be emphasised that, the number, the configuration and the type of the detecting module 180 are not limited to the above descriptions, and further details regarding technical features of the invention are provided below with other embodiments. It is to be noted that, in the following embodiments, components that are the same or similar to those of the previous embodiment are indicated with the same or similar reference numerals/notations, and descriptions thereof will not be repeated.

Figure 5:
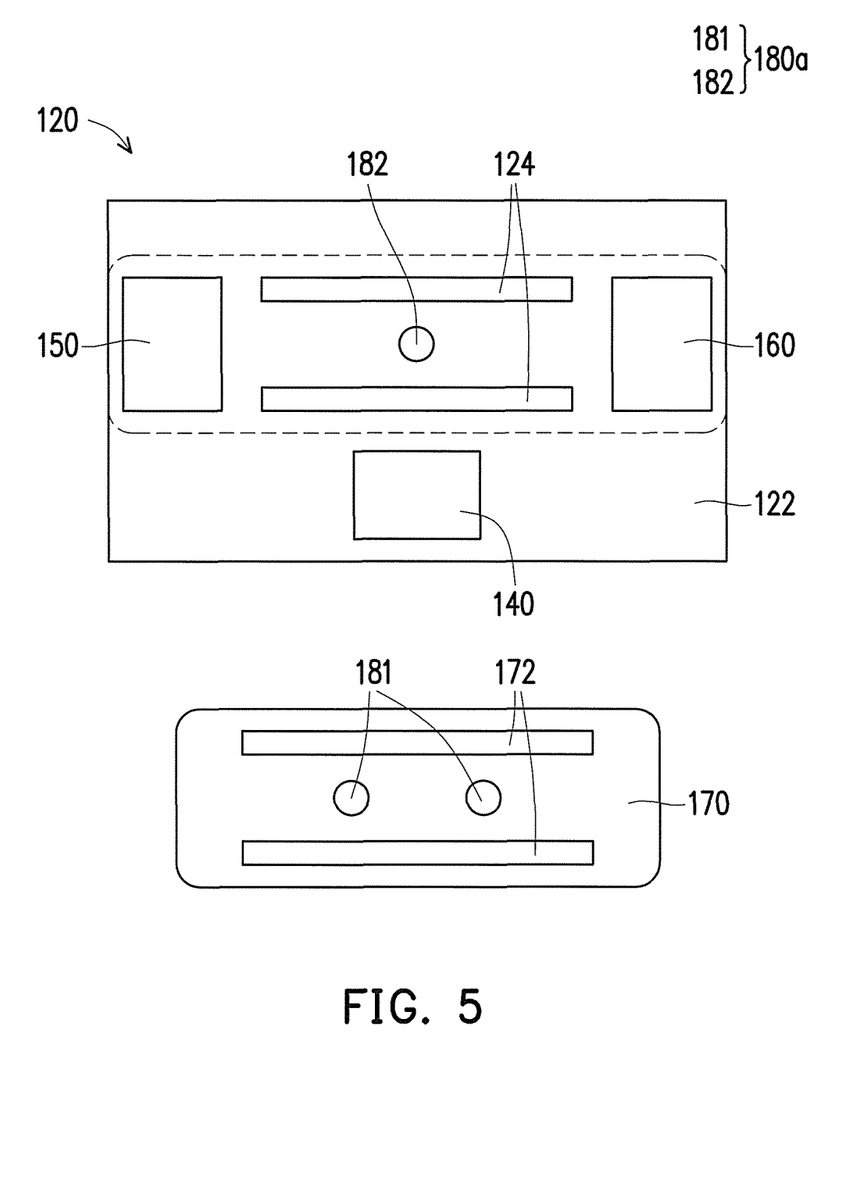
FIG. 5 is a schematic diagram illustrating backsides of a second body and a keyboard module of a portable electronic device according to another embodiment of the invention.

FIG. 5 is a schematic diagram illustrating backsides of a second body and a keyboard module of a portable electronic device according to another embodiment of the invention. More specifically, FIG. 5 shows that the second body 120 and the keyboard module 170 are took apart and the keyboard module 170 is flipped to the another side, so as to show the structure underneath the keyboard module 170 and the structure of the second body 120 located under the keyboard module 170 at the same time. Referring to FIG. 5, the keyboard module 170 includes a first sliding structure 172, and the casing 122 includes a second sliding structure 124 corresponded to the first sliding structure 172. The second sliding structure 124 is disposed between the second touch panel 150 and the third touch panel 160. The first sliding structure 172 may be a sliding rail, and the second sliding structure 124 may be a sliding hook. The keyboard module 170 is slidingly disposed on the casing 122 with the coordination of the first sliding structure 172 and the second sliding structure 124. Certainly, embodiments of the first sliding structure 172 and the second sliding structure 124 are not limited to the above.

A main difference between the embodiment of FIG. 5 and the previous embodiment lies in that, there is only one set of the detecting module 180a in the present embodiment. The detecting module 180a includes two magnetic members 181 and one magnetic sensor 182. The two magnetic members 181 are disposed at the lower surface of the keyboard module 170, and the magnetic sensor 182 is disposed on the casing 122 at a center portion covered by the keyboard module 170. In present embodiment, the two magnetic members 181 can have different magnetic forces, and the magnetic sensor 182 can determine the position of the keyboard module 170 with a magnetic value being sensed and transmit a corresponding signal to the processing unit 130 (as indicated in FIG. 1).

Figure 6:
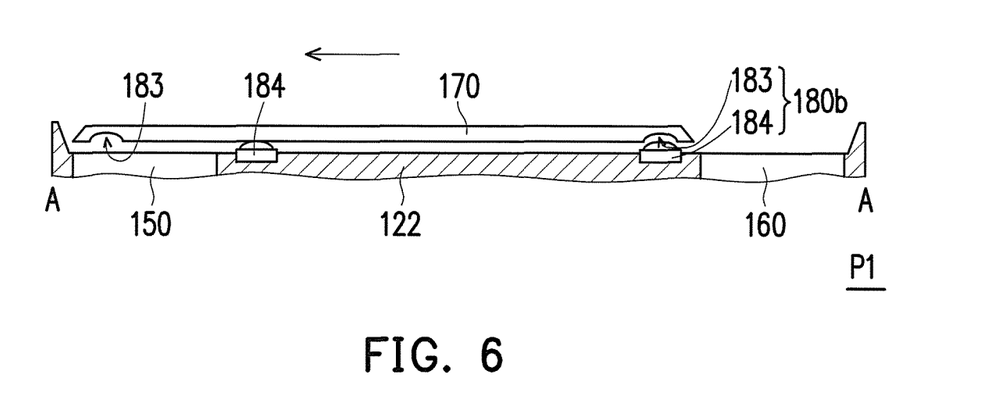
FIG. 6 is a partial schematic cross-sectional diagram illustrating a keyboard module of a second body of a portable electronic device being located at a first position according to yet another embodiment of the invention.
Figure 7:
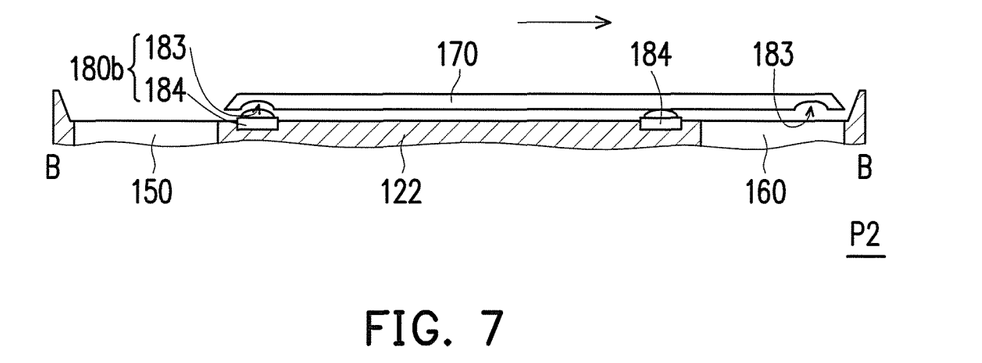
FIG. 7 is a partial schematic cross-sectional diagram illustrating the keyboard module of the second body of FIG. 6 being located at a second position.

FIG. 6 is a partial schematic cross-sectional diagram illustrating a keyboard module of a second body of a portable electronic device being located at a first position according to yet another embodiment of the invention. FIG. 7 is a partial schematic cross-sectional diagram illustrating the keyboard module of the second body of FIG. 6 being located at a second position. Referring to FIG. 6 and FIG. 7, a maintain difference between the embodiment of FIG. 6 and the embodiment of FIG. 1 lies in that, the present embodiment determines the position of the keyboard module 170 based on whether a sensing switch is being triggered. Each of the detecting modules 180b includes a sensing switch 184. The two sensing switches 184 are respectively disposed on the casing 122 at portions covered by the keyboard module 170. One of the sensing switches 184 is disposed close to the second touch panel 150 and the other one is disposed close to the third touch panel 160. The lower surface of the keyboard module 170 includes two recessed holes 183 at positions closes to the two sides thereof.

As shown in FIG. 6, when the keyboard module 170 moves to the first position P1, the sensing switch 184 located at the right side is released from an initial state of being pressed (namely, a state of extending into the recessed hole 183 at the right side), and the sensing switch 184 located at the left side contacts the lower surface of the keyboard module 170 located at the above and stays in the state of being pressed. The processing unit 130 (as indicated in FIG. 1) can determine that the keyboard module 170 is located at the first position P1 according to the signal received thereby, so that the first touch panel 140 can be turned on. Similarly, as shown in FIG. 7, when the keyboard module 170 moves to the second position P2, the sensing switch 184 located at the left side is released from an initial state of being pressed (namely, a state of extending into the recessed hole 183 at the left side), and the sensing switch 184 located at the right side contacts the lower surface of the keyboard module 170 located above and stays at the state of being pressed. The processing unit 130 can determine that the keyboard module 170 is located at the second position P2 according to the signal received thereby, so that the first touch panel 140 can be turned off.

It is to be explained that, the signal received by the processing unit 130 can be sent from the sensing switch 184 located at the left side, or can be sent from the sensing switch 184 located at the right side. In addition, the sensing switch 184 can continuously send out the signal under the state of being pressed and stop sending out the signal under the state of not being pressed, or vice versa, the sensing switch 184 can stop sending out the signal under the state of being pressed and continuously send out the signal under the state of not being pressed. Alternatively, the sensing switch 184 can also not sending out the signal under the state of being pressed and send out the signal when the sensing switch 184 moves into the recessed hole 183 and is in the state of not being pressed, or vice versa, the sensing switch 184 can send out the signal under the state of being pressed and not send out signal when the sensing switch 184 moves into the recessed hole 183 and is in the state of not being pressed. The method of sending out the signal by the sensing switch 184 can be determined according to the need of the user, and is not limited to the above.

Moreover, in the present embodiment, the cooperation between the protruding sensing switch 184 and the recessed hole 183 further provides a positioning function.

Certainly, in other embodiments, the sensing switch 184 may also be disposed at the lower surface of the keyboard module 170, and a portion on the casing 122 which is covered by the keyboard module 170 includes at least one recessed hole 183. Alternatively, a portion on the keyboard or the casing 122 which is corresponded to the sensing switch 184 may also be a bump, wherein the types and configuration of the components can be determined based on the need of the user, and are not being limited.

It is to be noted that, the sensing switch 184 and the recessed hole 183 may also be applied to the configuration as shown in FIG. 5. For instance, the sensing switch 184 may also be disposed at positions of the magnetic members 181 shown in FIG. 5, and the recessed hole 183 may also be disposed at a position of the magnetic sensor 182 shown in FIG. 5. When the keyboard module 170 slides to a designated position, one of the sensing switches 184 is moved into the recessed hole 183 and be released from the state of being pressed so as to send out a corresponding signal, and the processing unit 130 can thus determine whether the position of the keyboard module 170 is located at the first position P1 or the second position P2 according to the signal received thereby.

Figure 8:
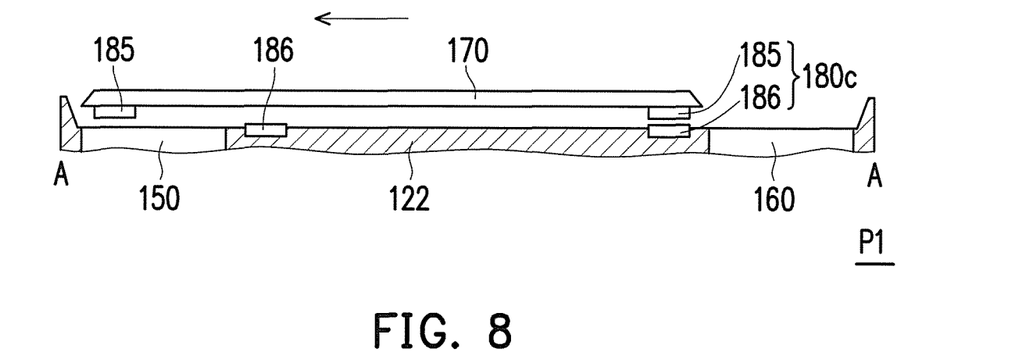
FIG. 8 is a partial schematic cross-sectional diagram illustrating a keyboard module of a second body of a portable electronic device being located at a first position according to still another embodiment of the invention.
Figure 9:
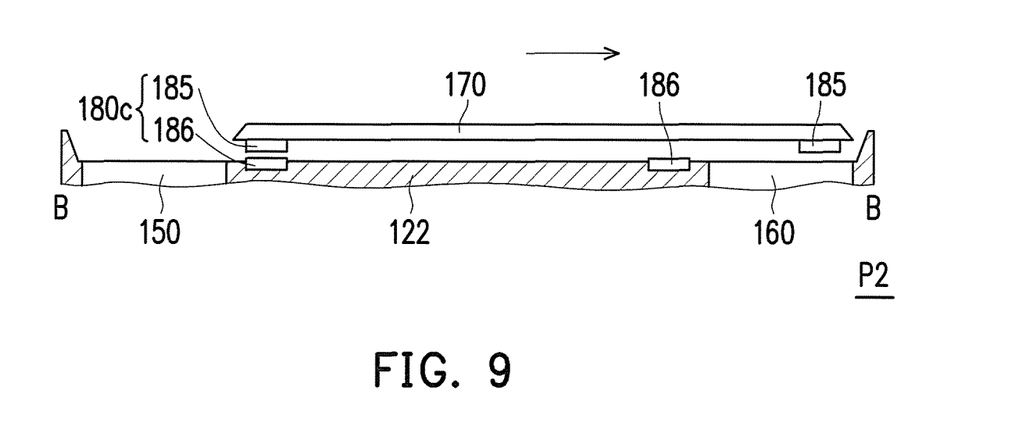
FIG. 9 is a partial schematic cross-sectional diagram illustrating the keyboard module of the second body of FIG. 8 being located at a second position.

FIG. 8 is a partial schematic cross-sectional diagram illustrating a keyboard module of a second body of a portable electronic device being located at a first position according to still another embodiment of the invention. FIG. 9 is a partial schematic cross-sectional diagram illustrating the keyboard module of the second body of FIG. 8 being located at a second position. Referring to FIG. 8 and FIG. 9, a main difference between the present embodiment of FIG. 8 and the embodiment of FIG. 1 lies in that, the present embodiment uses optical sensing to detect the position of the keyboard module 170. Each set of the detecting modules 180c includes an optical sensing module, and the optical sensing module includes at least one reflector 185 and an optical sensor 186. One of the reflector 185 and the optical sensor 186 is disposed at the lower surface of the keyboard module 170 while the other one is disposed on the casing 122 at a portion covered by the keyboard module 170.

In the present embodiment, the two reflectors 185 are disposed at the lower surface of the keyboard module 170 and close to the two sides, and the two optical sensors 186 are disposed on the casing 122 at the portion covered by the keyboard module 170. One of the optical sensors 186 is disposed close to the second touch panel 150 and the other one is disposed close to the third touch panel 160. As shown in FIG. 8, when the keyboard module 170 moves to the first position P1, the reflector 185 and the optical sensor 186 located at the right side are aligned. The optical sensor 186 located at the right side senses a light reflected by the reflector 185 located above and transmits a sensing result to the processing unit 130 with a first signal, so as to turn on the first touch panel 140. Similarly, as shown in FIG. 9, when the keyboard module 170 moves to the second position P2, the reflector 185 and the optical sensor 186 located at the left side are aligned. The optical sensor 186 located at the left side senses a light reflected by the reflector 185 located above and transmits a sensing result to the processing unit 130 with a second signal, so as to turn off the first touch panel 140.

Figure 10:
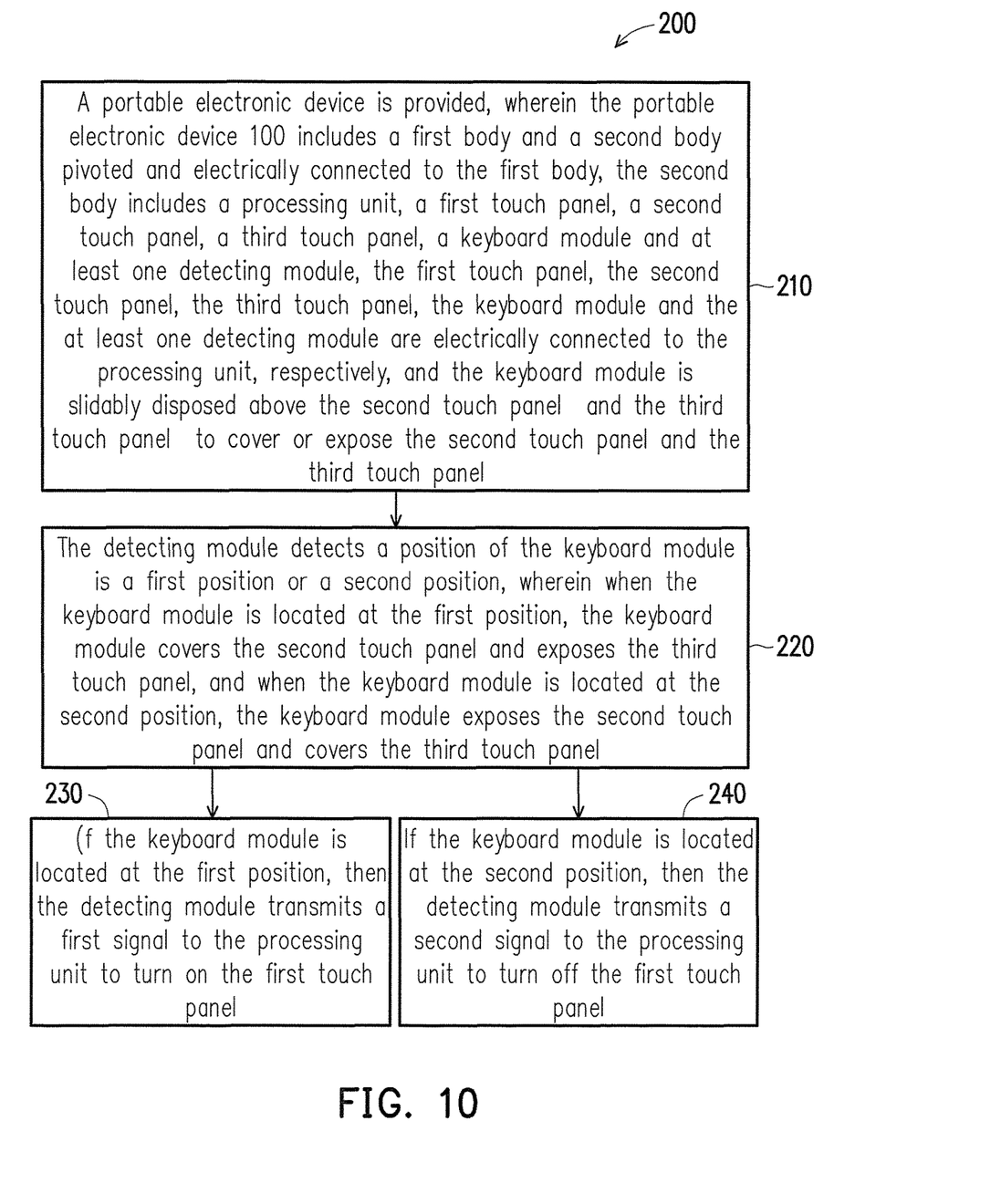
FIG. 10 is a schematic flow diagram illustrating a touch panel controlling method of a portable electronic device according to an embodiment of the invention.

FIG. 10 is a schematic flow diagram illustrating a touch panel controlling method of a portable electronic device according to an embodiment of the invention. Referring to FIG. 10, the touch panel controlling method 200 of the portable electronic device 100 includes the following steps: firstly, as shown in step 210, a portable electronic device 100 is provided, wherein the portable electronic device 100 includes a first body 110 and a second body 120 pivoted and electrically connected to the first body 110, the second body 120 includes a processing unit 130, a first touch panel 140, a second touch panel 150, a third touch panel 160, a keyboard module 170 and at least one detecting module 180, wherein the first touch panel 140, the second touch panel 150, the third touch panel 160, the keyboard module 170 and the at least one detecting module 180 are electrically connected to the processing unit 130, respectively, and the keyboard module 170 is slidably disposed above the second touch panel 150 and the third touch panel 160 to cover or expose the second touch panel 150 and the third touch panel 160.

Next, as shown in step 220, the detecting module 180 detects whether the keyboard module 170 is located at a first position P1 or a second position P2, wherein when the keyboard module 170 is located at the first position P1, the keyboard module 170 covers the second touch panel 150 and exposes the third touch panel 160, and when the keyboard module 170 is located at the second position P2, the keyboard module 170 exposes the second touch panel 150 and covers the third touch panel 160.

Further, as shown in step 230, if the keyboard module 170 is located at the first position P1, then the detecting module 180 transmits a first signal to the processing unit 130 to turn on the first touch panel 140. Otherwise, as shown in step 240, if the keyboard module 170 is located at the second position P2, then the detecting module 180 transmits a second signal to the processing unit 130 to turn off the first touch panel 140.

Figure 11:
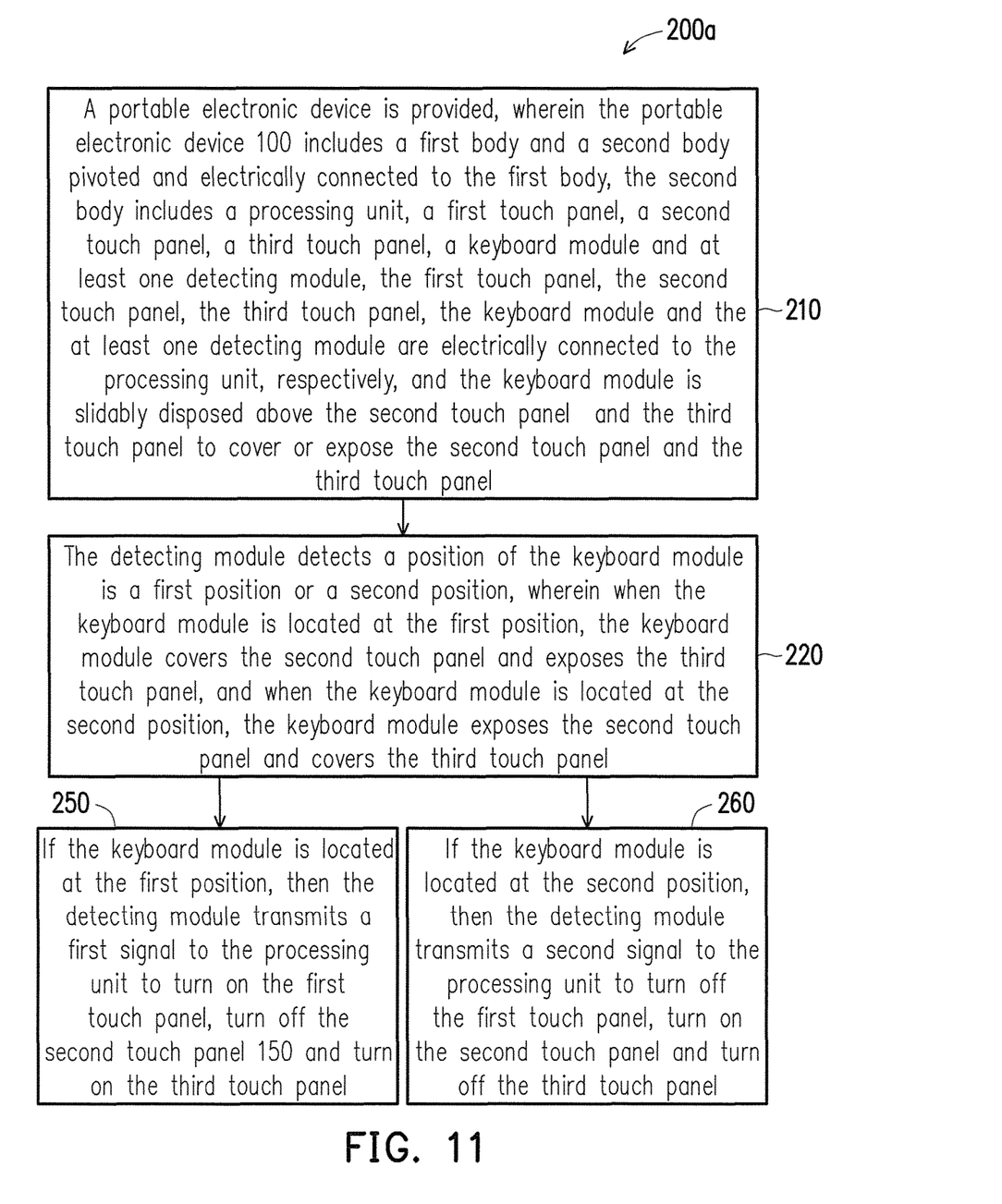
FIG. 11 is a schematic flow diagram illustrating a touch panel controlling method of a portable electronic device according to another embodiment of the invention.

FIG. 11 is a schematic flow diagram illustrating a touch panel controlling method of a portable electronic device according to another embodiment of the invention. Referring to FIG. 11, a main difference between the embodiment of FIG. 11 and the embodiment of FIG. 10 lies in that, in a touch panel controlling method 200a of the portable electronic device 100, after the step 220, as shown in step 250, if the keyboard module 170 is located at the first position P1, then the detecting module 180 transmits a first signal to the processing unit 130 to turn on the first touch panel 140, turn off the second touch panel 150 and turn on the third touch panel 160. Otherwise, as shown in step 260, if the keyboard module 170 is located at the second position P2, then the detecting module 180 transmits a second signal to the processing unit 130 to turn off the first touch panel 140, turn on the second touch panel 150 and turn off the third touch panel 160.

Figure 12:
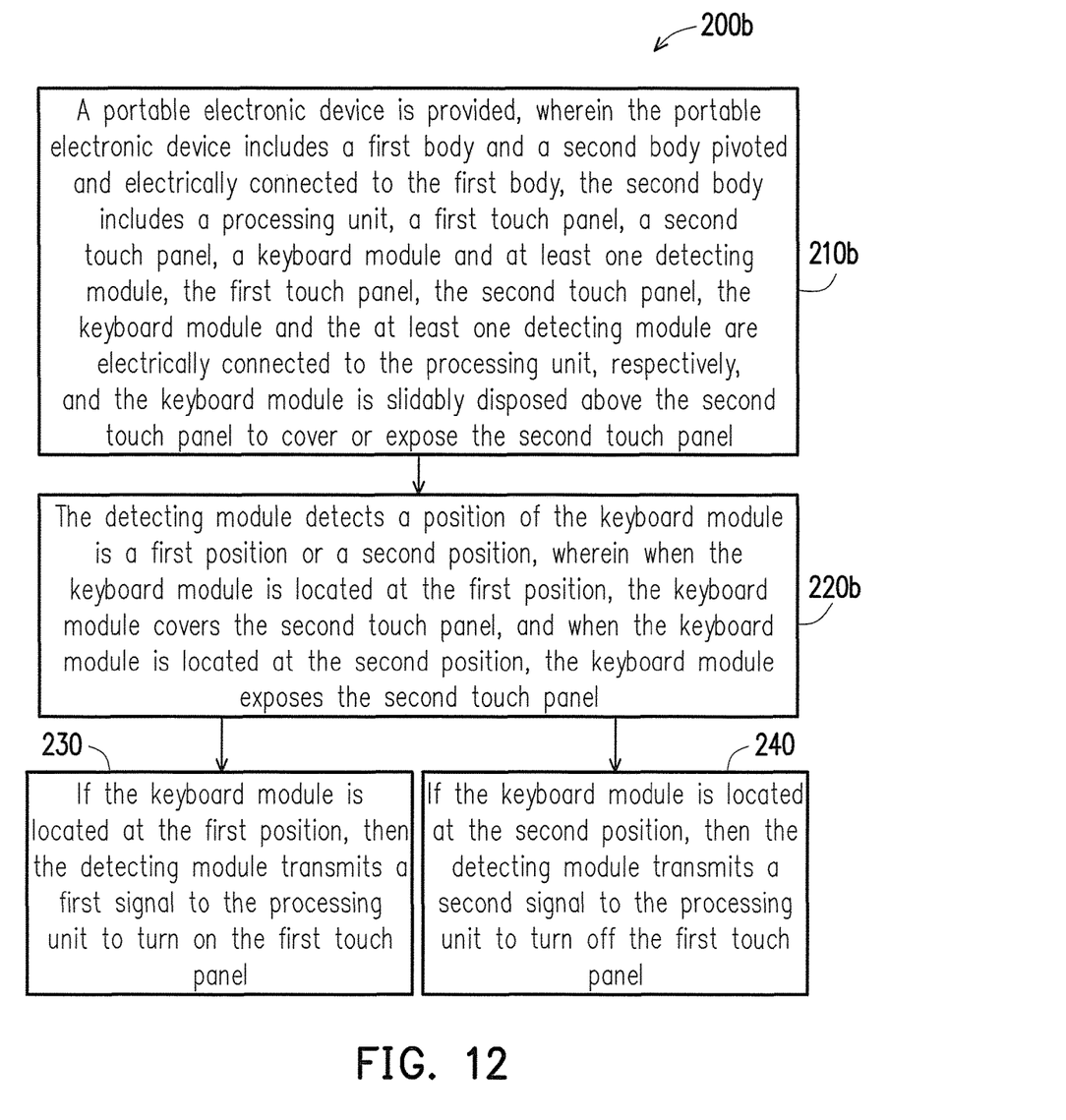
FIG. 12 is a schematic flow diagram illustrating a touch panel controlling method of a portable electronic device according to yet another embodiment of the invention.

FIG. 12 is schematic flow diagram illustrating a touch panel controlling method of a portable electronic device according to yet another embodiment of the invention. Referring to FIG. 12, main differences between the touch panel controlling method 200b of the present embodiment and the touch panel controlling method 200 lay in that, in the method 200b of the present embodiment, the portable electronic device 100 does not include the third touch panel 160, and mainly targeting at, when the keyboard module 170 is at the first position P1 and the second position P2, whether the processing unit 130 turns on or turns off the first touch panel 140 and whether the second touch panel 150 is covered or exposed by the keyboard module 170.

The touch panel controlling method 200b of the portable electronic device of the present embodiment includes the following steps: firstly, as shown in step 210b, a portable electronic device 100 is provided, wherein the portable electronic device 100 includes a first body 110 and a second body 120 pivoted and electrically connected to the first body 110, the second body 120 includes a processing unit 130, a first touch panel 140, a second touch panel 150, a keyboard module 170 and at least one detecting module 180, wherein the first touch panel 140, the second touch panel 150, the keyboard module 170 and the at least one detecting module 180 are electrically connected to the processing unit 130, respectively, and the keyboard module 170 is slidably disposed above the second touch panel 150 to cover or expose the second touch panel 150.

Next, as shown in step 220b, the detecting module 180 detects whether the keyboard module 170 is located at a first position P1 or a second position P2, wherein when the keyboard module 170 is located at the first position P1, the keyboard module 170 covers the second touch panel 150, and when the keyboard module 170 is located at the second position P2, the keyboard module 170 exposes the second touch panel 150.

Further, as shown in step 230, if the keyboard module 170 is located at the first position P1, then the detecting module 180 transmits a first signal to the processing unit 130 to turn on the first touch panel 140. Otherwise, as shown in step 240, if the keyboard module 170 is located at the second position P2, then the detecting module 180 transmits a second signal to the processing unit 130 to turn off the first touch panel 140.

Figure 13:
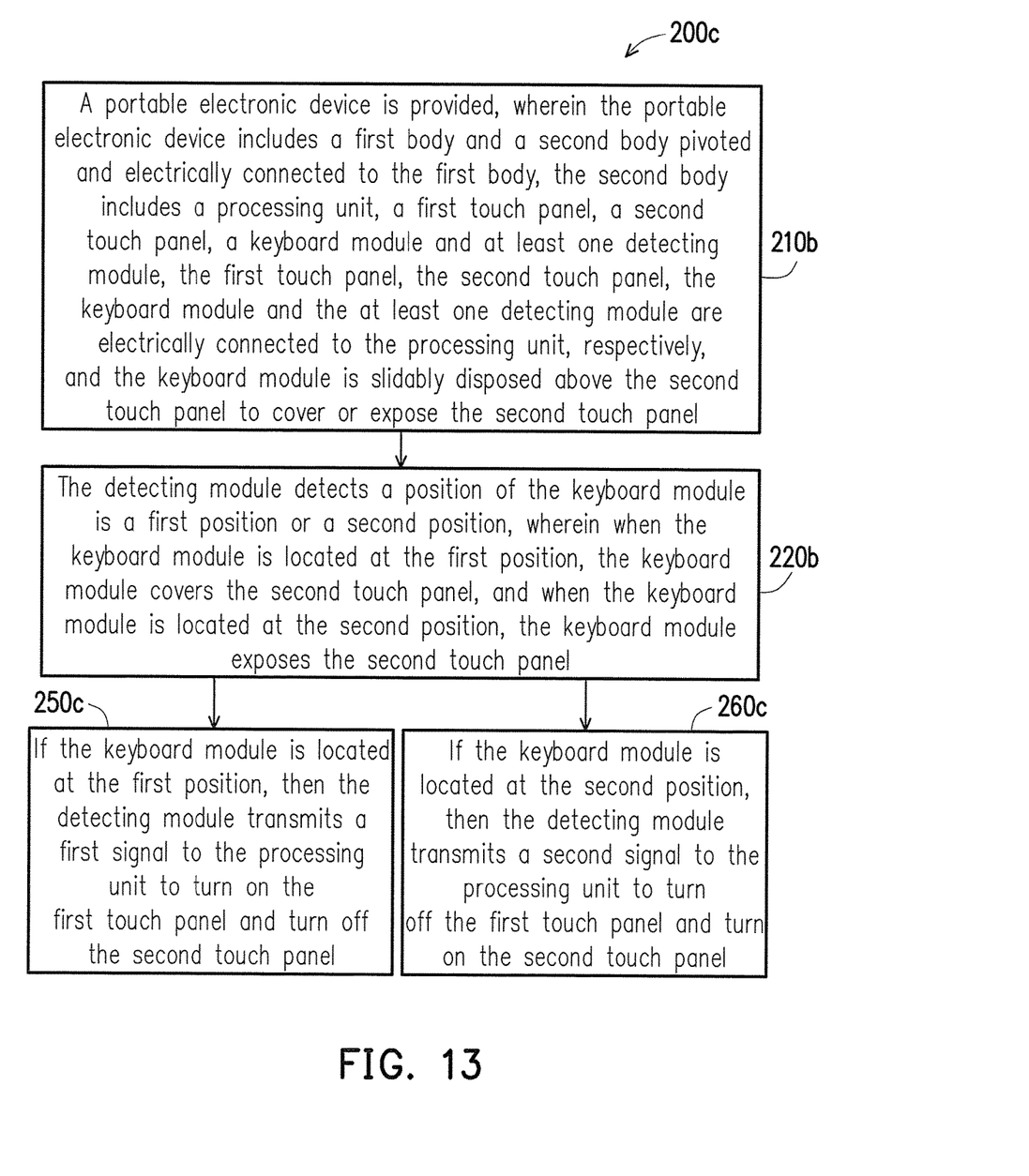
FIG. 13 is a schematic flow diagram illustrating a touch panel controlling method of a portable electronic device according to still another embodiment of the invention.

FIG. 13 is a schematic flow diagram illustrating a touch panel controlling method of a portable electronic device according to still another embodiment of the invention. Referring to FIG. 13, a main difference between the embodiment of FIG. 13 and the embodiment of FIG. 12 lies in that, in a touch panel controlling method 200c of the portable electronic device, after the step 220b, as shown in step 250c, if the keyboard module 170 is located at the first position P1, then the detecting module 180 transmits a first signal to the processing unit 130 to turn on the first touch panel 140 and turn off the second touch panel 150. Otherwise, as shown in step 260c, if the keyboard module 170 is located at the second position P2, then the detecting module 180 transmits a second signal to the processing unit 130 to turn off the first touch panel 140 and turn on the second touch panel 150.

The touch panel controlling method 200, 200a, 200b and 200c as described in the above can be used to control the portable electronic device 100, which has a plurality of touch panels, to turn on or turn off the first touch panel 140 that is not covered by the during the movement of the keyboard module 170, so that the portable electronic device 100 can save power and the user can be prevented from inadvertently touching the first touch panel 140.

In summary, the portable electronic device of the invention has a plurality of touch panels, that is, in addition to a touch panel generally being used to operate a cursor, the portable electronic device can further be configured with at least one touch panel with other functions, such as a gaming touch panel, a handwriting touch panel, a digital key touch panel, a music touch panel or a touch panel with arrow keys, thereby providing the user with faster and more diversified input methods. The invention further provides the touch panel controlling method of the portable electronic device, and in the portable electronic device of the invention, the keyboard module is slidably disposed above at least one touch panel to cover or expose the touch panel, and the processing unit turns on or off the touch panel which is not being covered during the movement of the keyboard module according to the position of the keyboard module detected by the detecting module. With the aforementioned touch panel controlling method, the portable electronic device, in addition to becoming more power saving, can further be avoided from inadvertent touch event, and thus enhances the operational convenience of the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device, comprising:
a first body, comprising a display screen; and
a second body, pivoted and electrically connected to the first body, comprising:
   a processing unit;
   a touch module, electrically connected to the processing unit;
   a first touch panel, electrically connected to the processing unit;
   a keyboard module, slidably disposed above the first touch panel and electrically connected to the processing unit; and
   at least one detecting module, electrically connected to the processing unit and adapted to detect a position of the keyboard module,
   wherein the keyboard module is adapted to move between a first position and a second position, when the keyboard module is located at the first position, the keyboard module covers the first touch panel, and the at least one detecting module transmits a first signal to the processing unit, so as to turn on the touch module, and
   when the keyboard module is located at the second position, the keyboard module exposes the first touch panel, and the at least one detecting module transmits a second signal to the processing unit, so as to turn off the touch module, wherein the second body further comprises a second touch panel electrically connected to the processing unit, the keyboard module is slidably disposed above the second touch panel, when the keyboard module is located at the first position, the keyboard module exposes the second touch panel, and when the keyboard module is located at the second position, the keyboard module covers the second touch panel.

2. The portable electronic device as recited in claim 1, wherein when the keyboard module is located at the first position or the second position, the first touch panel and the second touch panel are both in a turned-on state.

3. The portable electronic device as recited in claim 1, wherein when the keyboard module is located at the first position, the first panel is turned off and the second touch panel is turned on, and when the keyboard module is located at the second position, the first touch panel is turned on and the second touch panel is turned off.

4. The portable electronic device as recited in claim 1, wherein the second body comprises a casing, the touch module, the first touch panel and the second touch panel are exposed from the casing, the keyboard module comprises a first sliding structure, and the casing comprises a second sliding structure corresponded to the first sliding structure and disposed between the first touch panel and the second touch panel so as to enable the keyboard module to be slidingly disposed on the casing.

5. The portable electronic device as recited in claim 4, wherein the at least one detecting module comprises a magnetic sensing module, the magnetic sensing module comprises at least one magnetic member and a magnetic sensor, one of the at least one magnetic member and the magnetic sensor is disposed at a lower surface of the keyboard module, and the other one is disposed on the casing at a portion covered by the keyboard module.

6. The portable electronic device as recited in claim 4, wherein the at least one detecting module comprises an optical sensing module, the optical sensing module comprises at least one reflector and an optical sensor, one of the at least one reflector and the optical sensor is disposed at a lower surface of the keyboard module, and the other one is disposed on the casing at a portion covered by the keyboard module.

7. The portable electronic device as recited in claim 4, wherein the at least one detecting module comprises a sensing switch, the sensing switch is disposed on the casing at a portion covered by the keyboard module and a lower surface of the keyboard module comprises at least one recessed hole, or the sensing switch is disposed at the lower surface of the keyboard module and the casing comprises at least one recessed hole at a portion covered by the keyboard module.

8. The portable electronic device as recited in claim 1, wherein the first touch panel and the second touch panel are respectively a gaming touch panel, a handwriting touch panel, a digital key touch panel, a music touch panel or a touch panel with arrow keys.

9. The portable electronic device as recited in claim 1, wherein the processing unit comprises a controller, an embedded controller (EC), a central processing unit (CPU) or a micro controller unit (MCU).

10. A touch module controlling method of a portable electronic device, comprising:

providing a portable electronic device, wherein the portable electronic device comprises a first body and a second body pivoted and electrically connected to the first body, the second body comprises a processing unit, a touch module, a first touch panel, a keyboard module and at least one detecting module, wherein the touch module, the first touch panel, the keyboard module and the at least one detecting module are electrically connected to the processing unit, respectively, and the keyboard module is slidably disposed above the first touch panel to cover or expose the first touch panel;

the at least one detecting module detecting whether the keyboard module is located at a first position or a second position, wherein when the keyboard module is located at the first position, the keyboard module covers the first touch panel, and when the keyboard module is located at the second position, the keyboard module exposes the first touch panel;

if the keyboard module is located at the first position, then the at least one detecting module transmits a first signal to the processing unit to turn on the touch module; and if the keyboard module is located at the second position, then the at least one detecting module transmits a second signal to the processing unit to turn off the touch module, wherein the second body further comprises a second touch panel electrically connected to the processing unit, the keyboard module is slidably disposed above the second touch panel, in the step of the at least one detecting module transmitting the first signal to the processing unit, the first touch panel is turned off and the second touch panel is turned on, and in the step of the at least one detecting module transmitting the second signal to the processing unit, the first touch panel is turned on and the second touch panel is turned off.

11. The controlling method of touch module of the portable electronic device as recited in claim 10, wherein the second body further comprises a third touch panel electrically connected to the processing unit, the keyboard module is slidably disposed above the third touch panel, and in the step of the at least one detecting module transmitting the first signal to the processing unit and the step of the at least one detecting module transmitting the second signal to the processing unit, the second touch panel and the third touch panel are both in a turned-on state.

12. The controlling method of touch module of the portable electronic device as recited in claim 10, wherein the at least one detecting module detects whether the keyboard module is located at the first position or the second position through using magnetic sensing, optical sensing or a sensing switch.

13. The controlling method of touch module of the portable electronic device as recited in claim 10, wherein the first touch panel and the second touch panel are respectively a gaming touch panel, a handwriting touch panel, a digital key touch panel, a music touch panel or a touch panel with arrow keys.

14. The controlling method of touch module of the portable electronic device as recited in claim 10, wherein the processing unit comprises a controller, an embedded controller (EC), a central processing unit (CPU) or a micro controller unit (MCU).

* * * * *